Patented Dec. 14, 1937

2,102,119

UNITED STATES PATENT OFFICE 2,102,119

PROCESS OF PRODUCING A SLAG SOIL CONDITIONER

Lewis C. Henkel, Fairfield, Ala.

No Drawing. Application January 8, 1935, Serial No. 925

1 Claim. (Cl. 75—54)

This invention relates to an improved soil conditioner and the process or method of producing the same.

It is broadly old to utilize open hearth furnace slags for use as fertilizers.

The gist of the present invention resides in the use of bauxite as a slag thinner in open hearth practice, for the purpose of materially enriching the citrate soluble phosphoric acid content thereof. In the Southern mining territory of the United States and particularly in and around Alabama and the Birmingham district, the ores used in the production of iron and steel contain substantial percentages of phosphorus. According to the practice generally in use heretofore, fluorspar has been used as a slag thinner. This conventional use of fluorspar has a detrimental effect upon the citrate soluble phosphoric acid. This defect is recognized by competent authorities and text writers on the subject of fertilizers.

I have discovered that in the treatment of iron and steel in the Birmingham district, where fluorspar is used as a slag thinner, that a relatively low content of citrate soluble phosphoric acid is present in the slag. And since sixty percent is the minimum of citrate soluble phosphoric acid allowable as a soil conditioner, slags thinned with fluorspar in a practical sense are excluded as a source of phosphorus plant food.

But, if bauxite is used for a thinning agent instead of fluorspar, I have found a surprising and unexpected enormous increase in the percentage of the citrate soluble phosphoric acid in the slag. This enables me to convert what was formerly a commercially worthless slag, into a valuable by-product, namely, a soil conditioner rich in soluble phosphoric acid. Thus, the phosphorus content of my enriched slag can be readily assimilated by the soil.

I have determined by quantitative chemical analyses based on a test of thirty actual open hearth furnace heats that on the average of each 8.49 pounds of phosphoric acid ($P_2O_5$) produced 7.39 pounds was citrate soluble. This is an average of 87% of citrate soluble phosphoric acid.

Compared with this high percentage of soluble phosphorus, my analyses show that where fluorspar is used as a slag thinner for each 6.7 pounds of phosphoric acid produced only 1.8 pounds was citrate soluble. This expressed in percentage amounts to 26% citrate soluble phosphoric acid. Thus, this low percentage compares unfavorably with the 87% of soluble phosphorus produced according to my invention.

In practicing the invention, I deem it important to add sufficient bauxite to insure that more than 60% of the phosphorous ($P_2O_5$) content of the slag is citrate soluble, as a smaller percentage does not satisfactorily meet soil conditioning requirements.

The conventional manufacture of steel in an open hearth furnace may be regarded as one in which the charge is introduced into an open hearth furnace or other basic lined aparatus for the removal of impurities and refining of iron into steel by oxidation. The usual charge will consist of limestone, scrap, iron oxide and phosphatic pig iron. In the ensuing refining of the charge, the oxides of manganese, silicon, phosphorus and iron in combination with lime, form a slag rich in tri-calcium phosphate whose viscosity is such as to retard rapid refining of the molten charge. To increase the fluidity of the slag and increase the speed and refining, it is the conventional practice to add fluorspar to the slag to give it the desired fluidity. Such use of fluorspar as a finishing agent renders the greater portion of the phosphoric acid in the slag insoluble in citrate acid solutions. The chief characteristic feature of the present invention comprises substituting bauxite for fluorspar as a finishing agent for the express purpose of increasing the citrate soluble phosphoric acid content of the slag. I have found that such substitution of bauxite increase the amount of citrate soluble phosphoric acid to a remarkable and unexpected amount and renders the slag commercially valuable as a source of plant food. In this conventional open hearth steel practice, dephosphorization is accomplished by the universally accepted method of the present day; that is to say, that after oxidation, phosphorus is combined with a slag whose dominant constituent is lime, as tri-calcium phosphate.

As an illustration of the process followed in producing the improved product of my invention, the furnace charge used is the standard one including approximately 70% hot metal charge consisting of limestone approximately 24,000 pounds, iron oxide approximately 28,000 to 38,000 pounds, scrap approximately 110,000 pounds and hot pig iron approximately 255,000 pounds. This charge is melted and refined, in accordance with the conventional open hearth steel making methods with the single exception that for thinning the slag I use bauxite instead of the fluorspar generally employed as a thinner. The bauxite additions are made in the identical manner to that in which the conventional fluorspar additions are made, but in increased amounts in order to give the required fluidity to the slag. In my investigations and in actual practice, I have determined that it requires approximately 33% more slag thinner when bauxite is used than when fluorspar is used. But, this increased quantity of bauxite due to the difference in the prices of the two can be used and yet effect a saving, the bauxite being cheaper than fluorspar.

From the foregoing, it will be apparent that by the practice of my invention I am able to convert the slag which is practically useless in this district into a commercially saleable by-product, extremely rich in citrate soluble phosphoric acid and therefore well suited for use as a soil conditioner.

While I have described my invention by citing an example of specific steps in the manufacture of the improved product, it is to be understood that I am not limited to the precise steps or quantitative illustrations since variations may be resorted to without departure from the invention as defined in the appended claim.

What I claim is:—

In the method of forming a phosphate containing slag adapted for use as a fertilizer which comprises dephosphorizing by means of a strongly basic oxidizing slag in a basic open hearth furnace a molten metal steel bath containing a sufficient amount of phosphorus to be capable of introducing sufficient phosphorus in the slag to make the same adapted for use as a fertilizer, the step of thinning the slag during the refining process in the furnace by additions of bauxite to the molten slag to render the phosphate compounds in the slag citrate soluble.

LEWIS C. HENKEL.